United States Patent [19]
Nord et al.

[11] Patent Number: 4,863,012
[45] Date of Patent: Sep. 5, 1989

[54] ACCUMULATING CONVEYOR SYSTEM

[75] Inventors: Keith W. Nord; Mark S. Nord, both of Stillwater, Minn.

[73] Assignee: Nordway, Inc., Stillwater, Minn.

[21] Appl. No.: 133,538

[22] Filed: Dec. 16, 1987

[51] Int. Cl.$^4$ .............................................. B65G 13/06
[52] U.S. Cl. .................................. 198/781; 198/783; 198/784; 198/790
[58] Field of Search ............... 198/425, 460, 781, 783, 198/784, 790, 418.7

[56] References Cited
U.S. PATENT DOCUMENTS

| | | | |
|---|---|---|---|
| 3,893,282 | 7/1975 | Armbruster | 53/252 |
| 3,917,504 | 11/1975 | Neer | 156/453 |
| 3,988,875 | 11/1976 | Fay | 53/123 |
| 4,088,224 | 5/1978 | Kittredge | 198/790 |
| 4,171,179 | 10/1979 | Birkenfeld | 414/85 |
| 4,231,461 | 11/1980 | Hinchcliffe | 198/347 |
| 4,253,256 | 3/1981 | Feliz | 37/104 |
| 4,284,187 | 8/1981 | Kramer | 198/435 |
| 4,293,065 | 10/1981 | Dyer et al. | 198/790 |
| 4,311,231 | 1/1982 | Milazzo | 198/790 |
| 4,570,783 | 2/1986 | Newcom | 198/347 |

Primary Examiner—Joseph E. Valenza
Attorney, Agent, or Firm—Merchant, Gould, Smith, Edell, Welter & Schmidt

[57] ABSTRACT

An accumulating conveyor system and method for accumulating articles are disclosed. The first embodiment of the conveyor system (10) includes a primary conveyor belt (11) which moves within a transport channel (30) having horizontal rest rails (31). The primary conveyor belt (11) is preferably displaced in the vertical direction by means of an underlying accumulating conveyor belt (23) which includes a plurality of low plates (38) and high plates (39). When the primary conveyor belt (11) is positioned over the high plates (39), the articles (22) are transported in a plane above the rest rails (31), but when the primary conveyor belt (11) is supported upon the low plates (38), the articles (22) are supported by the rest rails (31) without the primary conveyor belt (11) rubbing against the bottoms of the articles (22). The second embodiment of the conveyor system (102) includes carrying rollers (83) which are engageable with a drive belt (84) by means of tension rollers (82). The tension rollers (82) are vertically displaceable by means of a pair of accumulating conveyor belts (92). Travelling sensor means (54) detects the presence of accumulation of the articles (22) at the downstream end (13) of the conveyor system. The sensor means (54) then cause the accumulating conveyor belt (23, 92) to move in a direction opposite to the primary conveyor belt (11, 89) so as to adjust the position of the high and low plates. A lift system is provided to transport accumulated articles (22) off the conveyor system in an end-to-end relationship. This lift system is controlled by means of a call sensor (68) and comprises a plurality of pistons (36, 90) which act to raise the conveyor system.

10 Claims, 7 Drawing Sheets

ACCUMULATING CONVEYOR SYSTEM

Field of the Invention

The present invention relates generally to a method and apparatus for accumulating articles at the end of a conveyor belt and, more particularly, to a method and apparatus in which the articles are accumulated by vertical displacement of the conveyor belt.

BACKGROUND OF THE INVENTION

When automated conveyor systems are utilized to transport articles, it is common for the articles to accumulate at the downstream end of the conveyor system for a variety of reasons. For example, a malfunction or disruption in a downstream operational station may occur to disrupt and back up the normal flow of articles. At times it may be desirable for this accumulation of articles to occur in order to package or further transport articles in groups of a particular size. For reasons of cost and convenience, it is undesirable to shut down and later restart the entire system in order to avoid an extensive back up of articles.

A common type of automated conveyor system is a straight-line, endless conveyor belt. In the normal operation of such a conveyor belt, the articles being conveyed often accumulate in an abutting relationship at the downstream end of the conveyor belt. Despite this accumulation, the conveyor belt continues to run underneath the backed-up articles, thereby rubbing against the bottom of the articles. After a short period of time, the friction of the conveyor belt causes the articles, or the boxes or crates which hold the conveyed articles, to become worn and damaged. This is a particular problem when fragile articles are being conveyed. As a result, the articles, conveying boxes or crates must be replaced or repaired at substantial inconvenience and expense.

The present invention addresses these and many other problems associated with currently available conveyor systems.

SUMMARY OF THE INVENTION

The present invention comprises an accumulating conveyor system having a primary conveyor belt which transports the articles from an upstream end to a downstream end of the conveyor system. The articles travel within a transport channel, the transport channel including horizontal rest rails. The invention includes means for vertically displacing the primary conveyor belt so as to move the primary conveyor belt from a position higher than the rest rails to a position lower than the rest rails. When in this lower position, the articles become supported upon the rest rails without the primary conveyor belt rubbing against the bottoms of the articles.

The primary conveyor belt is preferably displaced in the vertical direction by means of an underlying accumulating conveyor belt which includes a plurality of low plates and high plates. When the primary conveyor belt is positioned over the high plates, the articles are transported in a plane above the rest rails, but when the primary conveyor belt is positioned over the low plates, the articles are supported by the rest rails.

The second embodiment of the present invention comprises a plurality of carrying rollers which are driven by a drive belt so as to move the articles from the upstream end to the downstream end of the conveyor system. The drive belt is moveable between an upper engaged position which drives the carrying rollers and a lower disengaged position by vertical displacement means. The vertical displacement means comprises a pair of accumulating conveyor belts having high plates and low plates, with the drive belt being operably connected to the accumulating conveyor belts.

According to another aspect of the present invention, travelling sensor means detects the presence of accumulation of the articles at the downstream end of the conveyor system. The sensor means then causes the accumulating conveyor belt to move in a direction opposite to the primary conveyor belt or drive belt so as to adjust the position of the high and low plates. A lift system is also provided to transport accumulated articles off the conveyor system in an end-to-end relationship. This lift system is controlled by means of a call sensor and preferably comprises a plurality of pistons which act to raise the entire system.

Another aspect of the invention comprises a method for accumulating articles on a conveyor belt. The method comprises placing the articles upon the conveyor belt; lowering the conveyor belt below a stationary surface at the downstream end; sensing the extent of accumulation by means of the travelling sensor; and lowering a portion of the conveyor belt corresponding to and in proportion to the extent of accumulation of the articles.

The present invention is particularly advantageous in that it automatically accumulates articles at the downstream end of the conveyor system without wearing away or destroying the bottom end of the crates, boxes or articles being conveyed. The present invention also eliminates back pressure on the accumulated articles caused by the conveyor belt's movement beneath the stationary articles without the necessity of clamping or providing "stops" along the conveyor system. Further, the conveyor system of the present invention accumulates the articles automatically without the necessity of continually shutting down and restarting the entire system. Manual observation and actuation is therefore unnecessary, and labor costs are minimized.

Another advantageous feature of the present invention is that it is relatively simple in construction and easy to manufacture. It also can be retrofitted onto existing belt conveyor systems, and is flexible depending upon the size of the article to be conveyed and other characteristics of the system.

Further, the present invention is able to transport a plurality of accumulated items in groups. If, for example, a predetermined number of articles needs to be packaged together, that number of articles can automatically be accumulated and transported together.

For a better understanding of the invention, and of the advantages obtained by its use, reference should be had to the drawings and accompanying descriptive matter in which there is illustrated and described a preferred embodiment of the present invention.

BRIEF DESCRIPTION OF THE DRAWINGS

Referring particularly to the drawings, wherein like reference numerals indicate like parts throughout the several views.

DETAILED DESCRIPTION OF THE PREFERRED EMBODIMENT

A first embodiment of the accumulating conveyor system of the present invention is shown generally at 10. The conveyor system 10 includes a primary conveyor belt 11, which preferably is an independently controlled, separately driven endless conveyor belt. The conveyor system 10 comprises a first, upstream section 12 and a second, downstream section 13. The loop formed by the endless conveyor belt 11 has a horizontal, upper conveying path 25 and a lower return path 53. On each end of the conveyor system 10 can be a wide variety of stations or operations which do not depend upon the present invention. For example, the illustrations herein show a separate conveyor 14 proximate the downstream end 13 of the conveyor system 10. However, the secondary conveyor system 14 is not a part of the present invention and is for illustrative purposes only.

The two main conveyor sections 12, 13 are positioned in an end-to-end relation as shown to cooperate with each other and to provide a generally continuous conveyance. The primary conveyor belt or carrying belt 11 travels around a pair of conveyor gears, an upstream conveyor gear 15 and a downstream conveyor gear 16. The conveyor gears 15, 16 have a plurality of teeth 17 which cooperate with apertures in the individual links 18 in the primary conveyor belt 11.

The conveyor system 10 is supported above the floor 33 by a plurality of vertical legs 34. At their bottom end, the legs 34 have adjustment means 35 for vertically adjusting the height of the conveyor system 10.

Figures 4, 9:
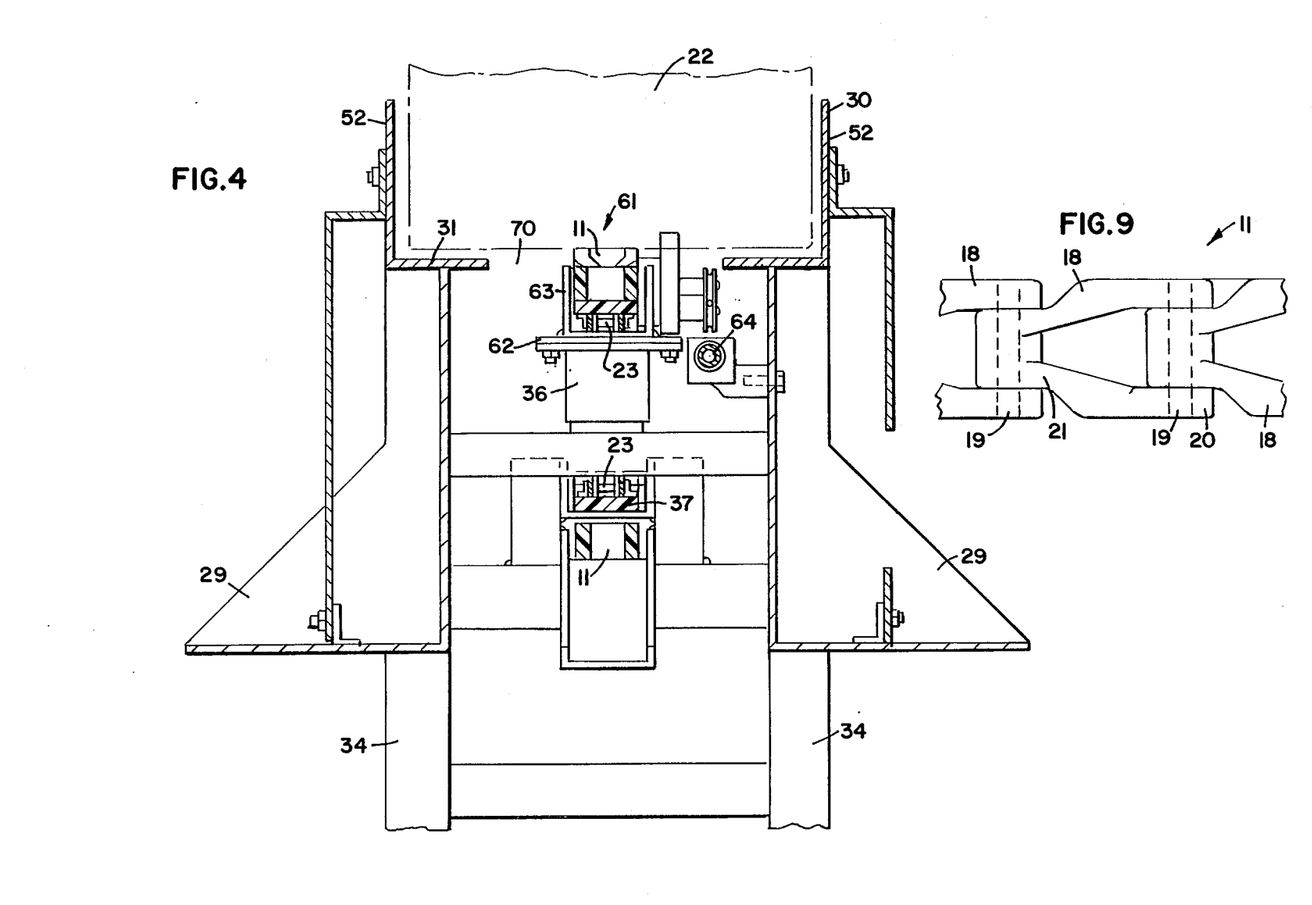
FIG. 4 is a side elevational view of the downstream end of the conveyor system of the present invention taken at line 4—4 of FIG. 2.
FIG. 9 is a top view of the primary conveyor chain used with the first embodiment of the present invention.

The detailed construction of the individual links 18 in the main conveyor chain 11 of the first embodiment is illustrated in FIG. 9. Each link 18 is preferably interconnected pivotally to adjacent links 18 by pins 19 at each end of the links 18. Each link 18 has a substantially forked shape, with a wide end 20 and a narrow end 21. The narrow end 21 fits within the wide end 20 of the adjacent chain and is interconnected by a pin 19.

A plurality of articles 22 are carried on top of the conveyor chain 11 within a stationary transport channel 30. The articles 22 are moved from the upstream end 12 toward the downstream end 13 at a desired predetermined speed. The transport channel 30 consists of a pair of opposite, longitudinal L-shaped members 52, each L-shaped member 52 having a horizontal portion 31 and a vertical portion 32. The longitudinal transport channel 30 extends substantially the entire length of the conveyor system 10, and its width is slightly larger than the width of the articles 22. The horizontal plane formed by the rest rails or horizontal portion 31 is slightly below the height of the conveying surface 42 of the conveyor belt 11, with the belt 11 running in the longitudinal opening 70 between the two opposing L-shaped members 52.

The conveyor system 10 also includes a "high-low belt" or accumulating conveyor belt 23. The accumulating conveyor belt 23 has a surface of variable height, and preferably is in the form of an independently controlled, separately driven endless conveyor belt. The accumulating conveyor belt 23 is positioned inside the loop formed by the primary conveyor belt 11 so that the upper surface 24 of the accumulating conveyor belt 23 touches and supports the bottom of the upper conveying path 25 of the primary conveyor 11. The conveyor chain 11 and underlying accumulating chain 23 are contained within a U-shaped support bracket 63. In the normal, non-accumulating mode, the accumulating conveyor belt 23 is stationary and the primary conveyor belt 11 moves in a counter-clockwise direction (as viewed in FIG. 5) upon the accumulating conveyor belt 23.

The accumulating conveyor belt 23 rotates around a pair of gears, an upstream gear 26 and downstream gear 27, each of which has a plurality of teeth 28 sized and configured to fit within apertures in the individual links 29 of the conveyor chain 23. The conveyor belt 11 and accumulating conveyor belt 23 are run by conventional driving means 29.

The accumulating conveyor chain 23 preferably includes a plurality of plates 37 which are interconnected to the outer surface of the accumulating conveyor chain 23 around its entire circumference. The width of the plates 37 is preferably greater than the width of the links 29, and the length of each plate 37 is approximately as long as two links 29. The plates 37 are of two types, high plates 38 and low plates 39. In the preferred embodiment, the high plates 38 are approximately two inches (2") in height, and the low plates 39 are approximately one inch (1") in height. The high and low plates 37 are grouped together respectively and each group occupies approximately half of the circumference of the accumulating conveyor chain 23. The two "high-low" points between the high plates 38 and the low plates 39 are designated 51. In normal operation with no accumulation, the high plates 38 underlie the conveying path 25 of the primary conveyor belt 11 and the low blocks 39 are positioned proximate the downstream end of the conveyor system 10.

Figures 6, 7, 8:
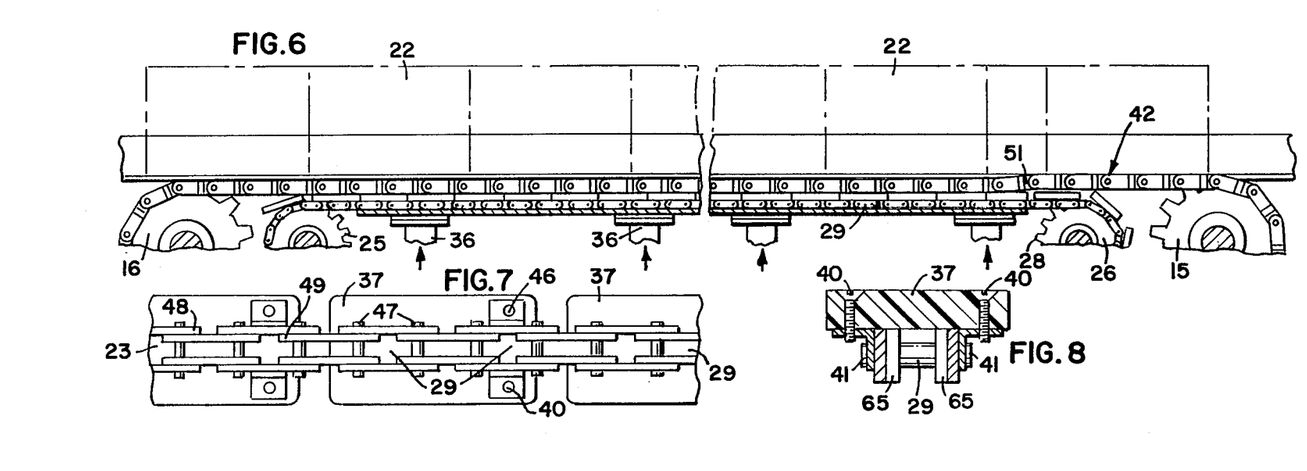
FIG. 6 is a side elevational view of the first embodiment of the conveyor system.
FIG. 7 is a bottom view of the accumulating chain of the first embodiment of the conveyor system.
FIG. 8 is a side elevational view, taken in section, of the accumulating chain shown in FIG. 7.

FIGS. 7 and 8 illustrate how the plates 37 are interconnected to the links 29 of the accumulating conveyor chain 23 by a plurality of suitable fasteners 40. Preferably, L-shaped flanges 41 are positioned on each vertical longitudinal edge 65 of the link 29, the horizontal portion of the flange 41 abutting the underside of the plate 37 and the vertical portion of the channel abutting the side 65 of the link 29. In the preferred embodiment, a plurality of screws 40 extend through the plate 37 and are interconnected to the flanges 41 on each side of the link 29 of the accumulating conveyor chain 23.

Only one end of the plate 37 is interconnected to a link 29 in the preferred embodiment. This is so that the plate 37 need not bend or be subject to undue stresses when the accumulating conveyor belt 23 rotates about the gears 26, 27. As a result, the unattached end of the plate 37 may occasionally move away from the accumulating conveyor belt 23, as shown by the plates 37 near the gears in FIG. 5. However, the plates 37 are flat against the accumulating conveyor belt 23 when in the horizontal position. Because the plates 37 are longer than the links 29, the fastener means 40, 41 is attached only to every other link 29. In the preferred embodiment, the plates are made of a sturdy plastic material.

The height of the plates or blocks 37 is such that the top surface 42 of the conveyor belt 11 is higher than the horizontal rest rails 31 of the transport channel 30 when the conveyor belt is positioned upon the high blocks 38. Conversely, the top surface 42 of the conveyor belt 11 is below the horizontal portion 31 of the transport channel 30 when the conveyor belt is positioned upon the low blocks 39. In this manner, when the conveyor chain 11 is riding upon the high blocks 38, the conveyor chain 11 transports the articles 22, and the articles 22 move along slightly above the plane of the rest rails 31 of the transport channel 30. However, when the conveyor chain is positioned against the low blocks 39, the upper surface 42 of the conveyor chain 11 resides in a plane below the rest rails 31 of the transport channel 30, such that the conveyor chain 11 is not in contact with the bottom of the articles 22, and the articles 22 rest against the transport channel 30 in a stationary position and accumulate. The conveyor belt 11 has an upper portion supported by the high plates 38 and a lower portion supported by the low plates 39.

The configuration of the individual links 29 of the accumulating conveyor belt 23 is illustrated in FIG. 7. The links 29 are interconnected pivotally to each other by a plurality of pins 47. The accumulating conveyor belt 23 preferably consists of a plurality of outer parallel members 48 and inner parallel members 49 which are interconnected at their respective ends by the pins 47.

Figure 1:
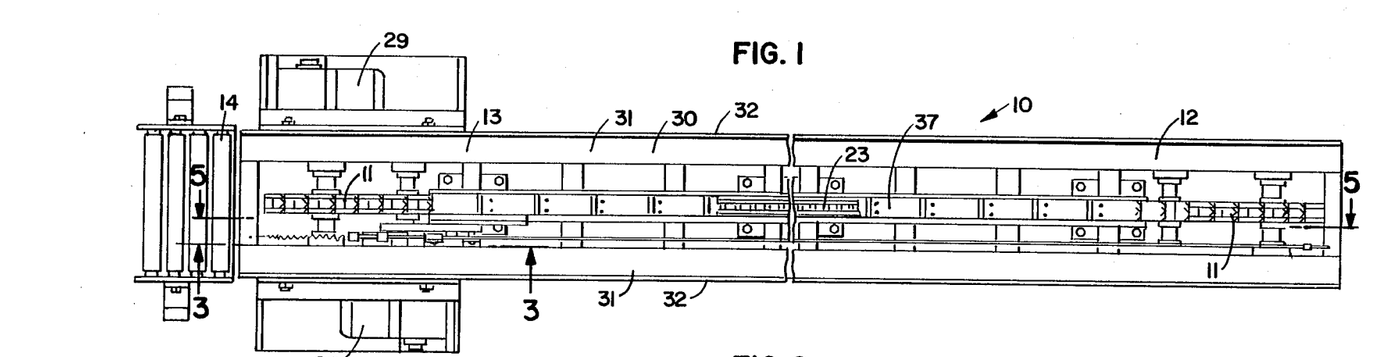
FIG. 1 is a plan view of the first embodiment of the accumulating conveyor system of the present invention.

Thus, the conveyor system shown in FIGS. 1–9 as the first embodiment has three "layers": the primary conveyor belt 11; the plates 37; and the accumulating conveyor belt 23. Cutaway views have been taken in FIG. 1 to illustrate the various layers. The center portion of FIG. 1 illustrates a top view of the accumulating conveyor belt 23. On each side of the accumulating conveyor belt 23 are cutaway sections which illustrate the plates 37. At the outer ends of FIG. 1, there are cutaway illustrations of a top view of the main conveyor belt 11.

Figure 2:
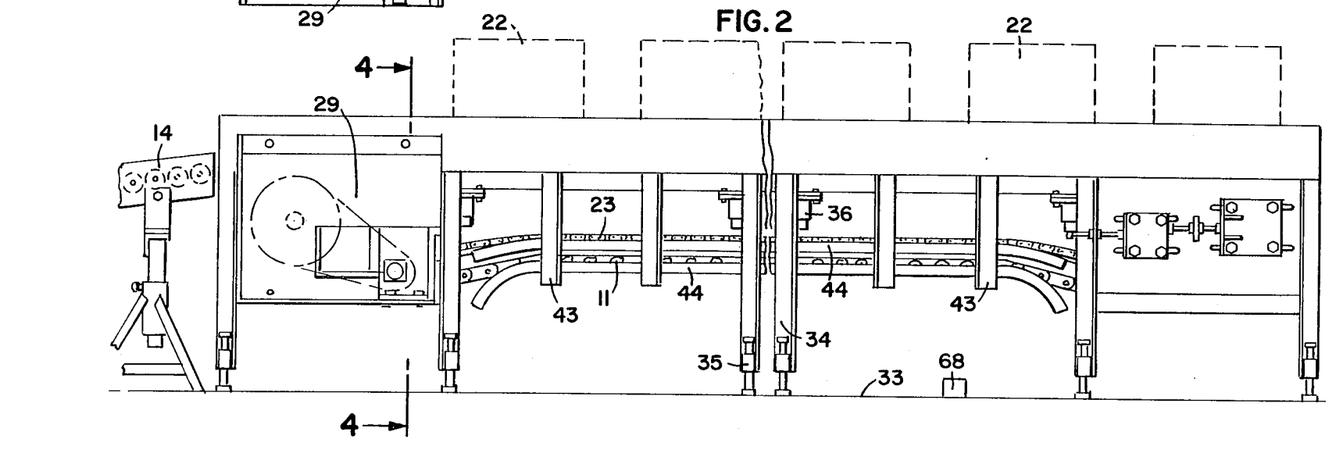
FIG. 2 is a side elevational view of the conveyor system shown in FIG. 1.
Figure 5:
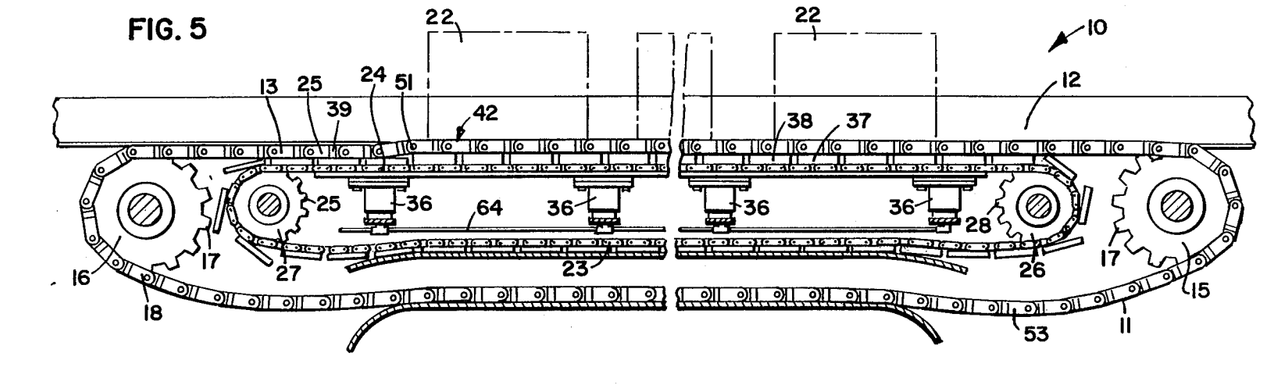
FIG. 5 is a side elevational view of the conveyor belts of the present invention taken at line 5—5 of FIG. 1.

In normal operation, the articles 22 move along the main conveyor belt 11, above the horizontal rest rails 31 of the transport channel 30. In this manner, the articles 22 proceed downstream on the conveyor belt 11 in a spaced apart relationship, as illustrated in FIG. 2. The accumulating conveyor chain 23 is stationary in this normal operation when no accumulation is desired, and the high-low point 51 is located proximate the downstream gear 27, as illustrated in FIG. 5. The first article 22 moves along the chain 11 until the chain 11 reaches the high-low point 51, at which time the article 22 descends to the rest rails 31 and comes to a rest at the downstream end of the transport channel 30. The article 22, in normal operation, is then removed from the end of the conveyor system 10 for processing at the next station.

However, it may occasionally happen that the first article 22 does not progress to the next station but instead stays at the end of the conveyor system 10. Nevertheless, the other articles 22 continue to progress down the line. In this situation, sensing means detects the presence or absence of build-up of the articles 22 at the downstream end. If there is a build-up, the sensing means actuates movement of the high-low point 51 farther back from the downstream end 13 of the conveyor system (toward the right as viewed in FIG. 5). The distance which the accumulating conveyor 23 and high-low point 51 moves corresponds to the size of the articles 22. The accumulating conveyor is moved by conventional driving means such as a motor 29. When the accumulating conveyor belt 23 is actuated, the primary conveyor belt 11 and accumulating conveyor belt 23 run in opposing directions, that is, the conveyor belt runs in a counter-clockwise direction as shown in FIG. 5 and the accumulating conveyor belt 23 runs in a clockwise direction.

Figure 3:
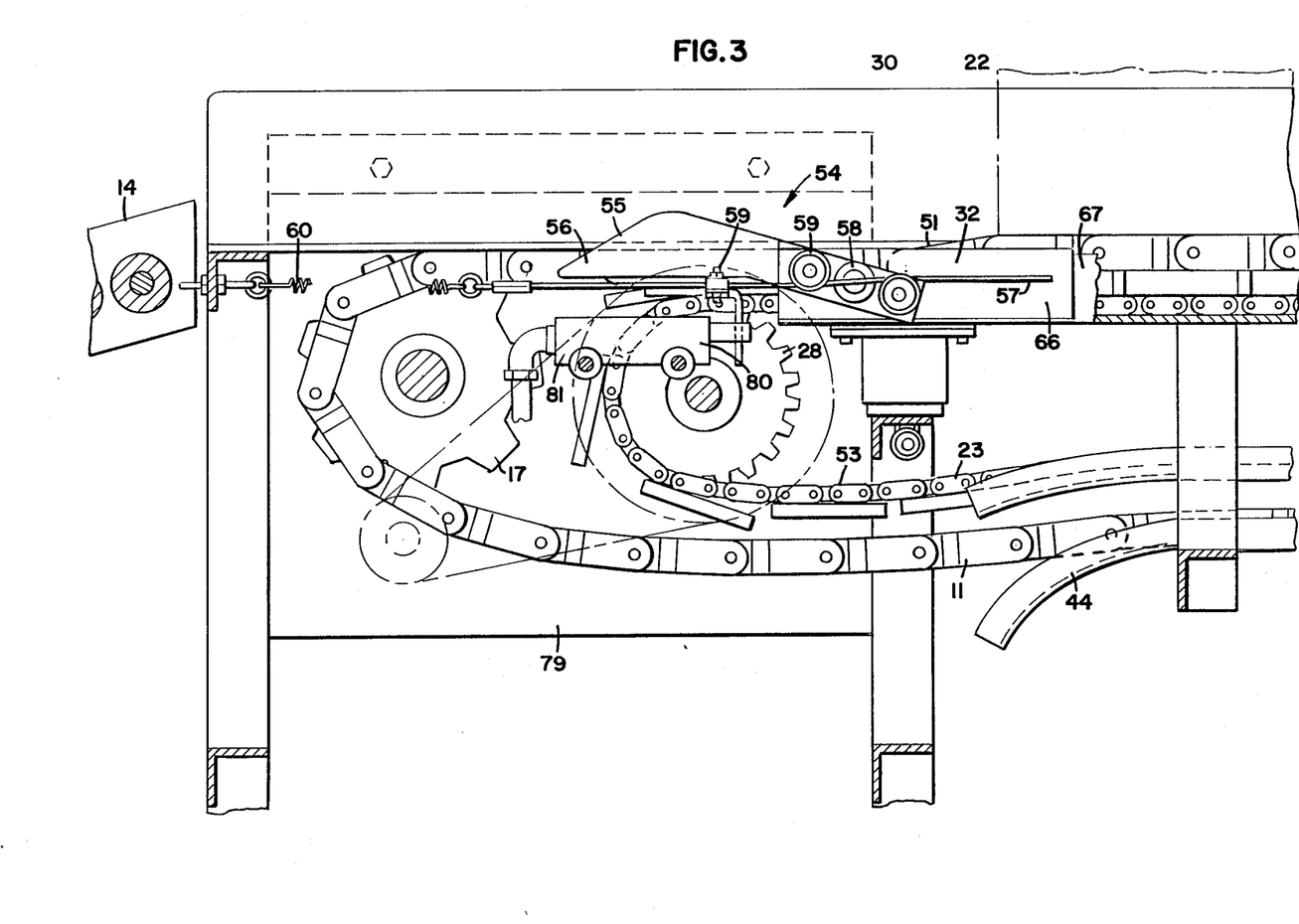
FIG. 3 is an enlarged side elevational view of the downstream end of the conveyor system of the present invention taken at line 3—3 of FIG. 1.

One embodiment of the sensor means is illustrated in FIG. 3. One part of the sensor means 54 is an extension bar 55 positioned within the transport channel 30. The bar 55, in normal operation, is in its raised position, but, when an article 22 passes over and rests upon the extension bar 55, the extension bar 55 lowers, as shown by the arrow in FIG. 3. A plurality of ring guides 59 are interconnected to the extension bar 55, and movement of the bar 55 causes the ring guides 59 to move the sensor cable 57 slightly. The pulling motion on the cable 57 activates a limit switch 80 which is positioned in a box housing 81.

Each time an article 22 passes over the lever arm 55 and causes it to pull the sensor cable 57, an electrical signal is generated. The electrical signal from the extension bar 55 is supplied to electronic control circuitry (not shown) which includes a time circuit (not shown). If the sensor means is depressed for a certain period of time, for example, over six seconds, this indicates that the article 22 has backed up along the conveyor system 10. This generates a constant electrical signal which causes actuator signals to be generated.

If, after this time delay, there is no movement of the article 22, the high-low point 51 is moved back an indexed distance from the downstream end 13 of the conveyor system 10. The distance which the high-low point 51 or accumulating chain 23 will move depends upon the size of the articles 22 being conveyed, and the distance is generally equal to the length of the article 22.

The sensor means 54 is operatively connected to the accumulating conveyor 23 so as to move with the accumulating conveyor 23. In this manner, the sensor means 54 moves along the conveyor system 10 in an indexed fashion to detect the extent of the build-up of the accumulated articles 22. The sensor means 54 is positioned behind the high-low point 51, i.e., to the left of the high-low point 51 as viewed in FIG. 3.

When the accumulating conveyor 23 and travelling sensor 54 move the travelling sensor 54 is pulled from beneath the first article 22 and resumes its raised position in which it does not pull on the sensor cable 57. If a second article 22 then passes over and depresses the extension arm 55, another electrical signal is generated which, after a time delay, moves back the accumulating conveyor 23 and high-low point 51 an additional predetermined distance. This process continues as each article 22 is accumulated proximate the downstream end 13 of the conveyor system 10. Thus, the position of the high-low point 51 depends upon the number of articles 22 which have accumulated, but the high-low point is positioned behind the final accumulated article 22.

One end of the lever arm 55 is pivotally interconnected to a slide 66 by suitable fasteners 58. The slide 66 is operatively connected to the accumulating conveyor 23. The slide 66 preferably contains a longitudinal slot which accommodates a vertical side portion 67 of the U-shaped bracket 63. Thus, the slide 66 is slidably interconnected to the U-shaped bracket 63 and moves along the U-shaped bracket 63 in conjunction with the movement of the accumulating conveyor 23.

The ring guides 59 guide the sensor cable 57 and permit the sensor means 54 to move along the sensor cable 57, and also accommodate the pivotal movement of the lever arm 55. The sensor cable 57 is kept at proper tension by a spring 60.

An alternative travelling sensor means 54 is a light sensor. This type of sensing means includes a travelling light source or emitter on one side of the conveyor belt 11 and an aligned light-sensitive component or receiver on the other side of the conveyor 10. This type of sensing means would generate electrical signals in the same manner as the extension bar sensor means 54 when an accumulated article 22 blocks the light source.

A call sensor 68 actuates a lift system means, which transports a plurality of the grouped articles 22 off the conveyor system 10. The call sensor 68 becomes actuated when a plurality of articles 22 become backed up end-to-end toward the downstream end 13 of the conveyor system 10. In the preferred embodiment, this lift system or transporting means comprises a piston system 61. A plurality of pistons 36 are interconnected to the upper end of the vertical support legs 34 of the conveyor system 10. Horizontal plates 62 rest upon the top of the pistons 36, and the horizontal plates 62 are located beneath the U-shaped bracket 63 which supports the conveyor belt 11 and accumulating belt 23.

The piston system 61 can be run by either hydraulic or pneumatic means, and a tube 64 carries the hydraulic fluid or air to the pistons 36. The number and size of the pistons 36 depend upon the weight of the articles 22. When the piston system 61 is actuated, the cylinders in the pistons 36 rise and cause the conveyor belts 11, 23 to rise and touch the bottom of the articles 22. The articles 22 are thereby lifted above the rest rails 31 of the transport channel 30. The driving means then rotates both of the belts 11, 23 toward the downstream end 13 of the conveyor system 10 (in a counterclockwise direction as viewed in FIG. 5). This moves the articles 22 downstream, as well as returning the high-low point 51 to its original downstream position. When the high-low point is returned to its original position, the call sensor 68 deactuates and lowers the pistons 36 to allow the conveyor system to continue its normal operation.

Alternatively, the piston system 61 can transport a group of articles 22 from a certain point along the conveyor system 10 in order to deliver the articles 22 in groups of predetermined size. The latter embodiment may be preferable if the articles 22 are to be packaged together.

Either a manual or automatic actuating means 68 can be used with the piston system 61. In the former situation, an operator can actuate the call sensor 68 and piston system 61 when he views the particular situation of accumulating articles. The operator can hold the light source or call sensor 68 in his hand and manually activate the call sensor 68. In the preferred embodiment, the call sensor 68 is automatic and comprises a light source which is positioned underneath the conveyor system 10 below the longitudinal opening 70 in the transport channel and proximate the upstream end 12. When the light source 68 is covered or darkened, an electrical signal is generated. This blockage of the light source 68 can occur when an article 22 becomes backed up to a point in the conveyor system above the light source 68. This particular call sensor configuration is flexible, in that the position of the light source 68 can be changed to accommodate the particular needs of the situation.

In the operation of the first embodiment of the conveyor system, the articles 22 move along the conveyor system 10 by riding upon the main conveyor belt 11, which passes above the high plates 38. At the downstream end 13 of the conveyor belt 11, the article passes the high-low point 51, where the article comes to a stop upon the rest rails 31 of the transport channel 30. When one of the articles 22 stops at the end of the conveyor system 10 without being removed therefrom for transport to the next station, travelling sensor means 54 detects that the article 22 has remained in place without being removed. After a certain predetermined amount of time, the accumulating conveyor 23 and travelling sensor means 54 move back from the downstream end 13. The accumulating chain 23 also moves back an indexed, predetermined distance depending upon the size of the article 22. When the highlow point 51 is moved behind the last accumulated article 22, the primary conveyor chain 11 rides upon the low blocks 39, so that the chain 11 does not rub against and wear away the bottom of the articles 22. When the second and subsequent articles are accumulated, the accumulating chain 23 and travelling sensor means 54 continue to advance in increments. When it is desired to move the accumulated articles 22 off of the conveyor system 10, the call sensor 68 actuates the piston system 61, which lifts the conveyor belt above the rest rails 31 of the transport channel 30. The entire system, that is, the articles 22, the primary belt 11, and the accumulating belt 23, are then moved toward the downstream end 13 of the conveyor system 10. The accumulating conveyor 23 and high-low point 51 are returned to their original positions, at which time the call sensor lowers the pistons 36. The accumulating process then continues.

Figure 10:
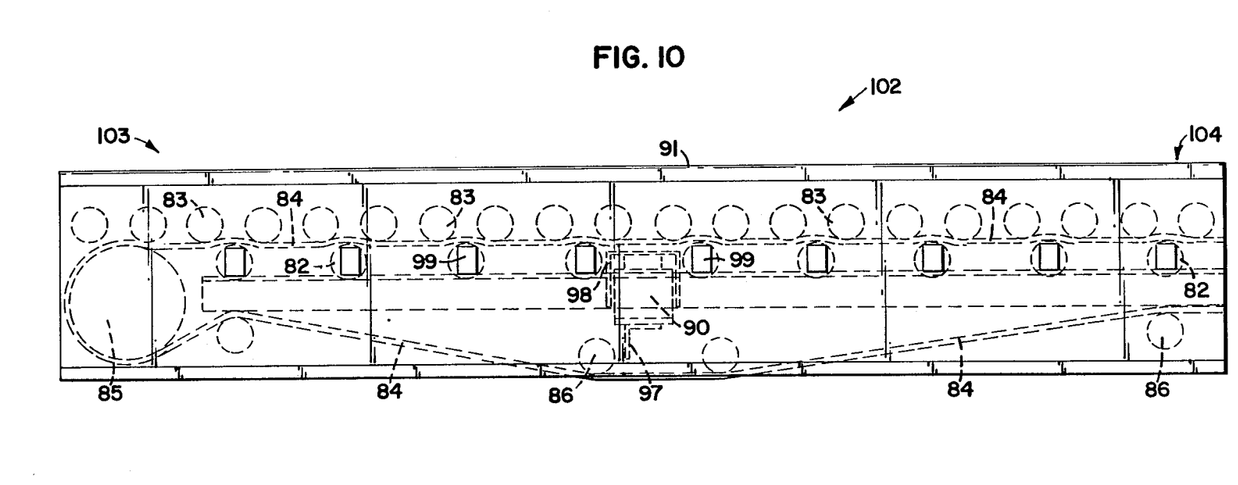
FIG. 10 is a side elevational view of the second embodiment of the accumulating conveyor system of the present invention.
Figure 11:
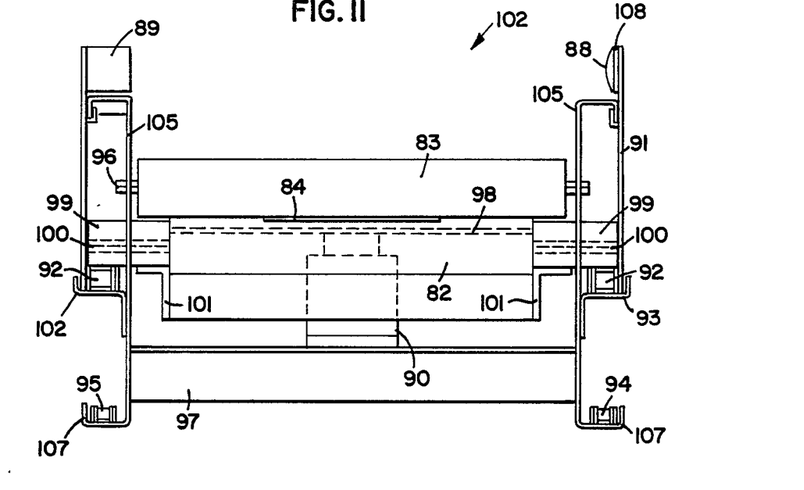
FIG. 11 is an end elevational view of the conveyor system shown in FIG. 10.
Figure 12:
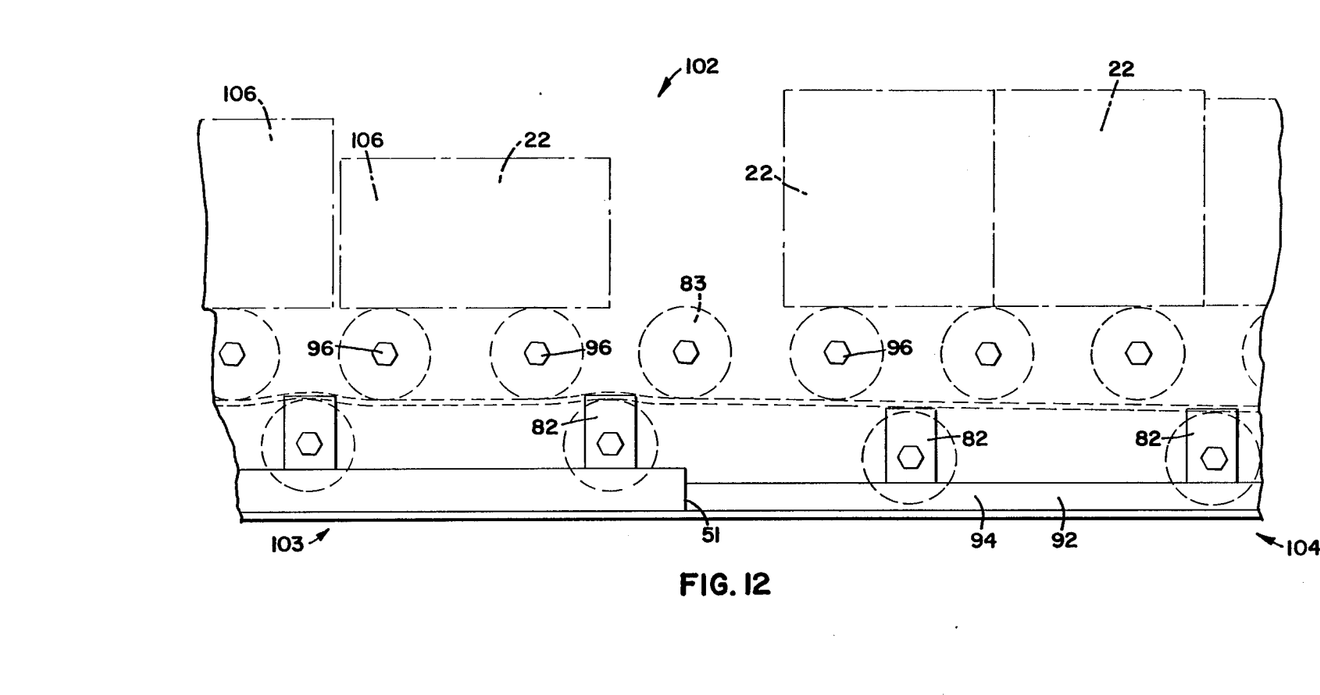
FIG. 12 is an enlarged side elevational view of the conveyor system shown in FIGS. 10-11.

The second embodiment of the conveyor system of the present invention, shown generally at 102, is illustrated in FIGS. 10–12. The conveyor system 102 has a first, upstream section 103 and a second, downstream section 104. The conveyor system 102 includes a plurality of carrying rollers 83 upon which the articles 22 are transported. The carrying rollers 83 are spaced apart by a predetermined distance and in a parallel relationship. The carrying rollers 83 are free-hanging, being mounted upon a central shaft 96 which is rotatably mounted within a conveyor system frame 91.

The conveyor system 102 is supported above the floor by the frame 91 and a plurality of support legs (not shown), as was described above for the first embodiment 10 of the present invention. The carrying rollers 83 can be made of a material such as steel, aluminum or plastic. The length of the carrying rollers 83 can be varied as desired, depending upon the size of the product 22 to be conveyed. In the preferred embodiment, there is a transport channel or continuous guide walls 105 on each end of the carrying rollers 83 to direct the articles 22 being conveyed down the conveyor system 102. The upright surfaces 105 extend the entire length of the conveyor system 102.

Located beneath the carrying rollers 83 is a continuous drive belt 84, which passes around a pair of gears 85. The gears 85 are independently controlled and driven by conventional means such as a motor (not shown). The loop formed by the endless drive belt 84 has a horizontal, upper path and a lower return path which is guided by a plurality of return rollers 86. When the rotating drive belt 84 comes into contact with the bottom of the carrying rollers 83, the carrying rollers 83 rotate and thereby transport the articles 22 toward the downstream end 104 of the conveyor system 102. When the drive belt 84 is lowered so as to not be in contact with the carrying rollers 83, the carrying rollers 83 become stationary and the articles 22 are accumulated upon them.

The second embodiment of the conveyor system includes means for engaging the drive belt 84 with the carrying rollers 83 so as to cause the carrying rollers 83 throughout the entire length of the conveyor system 102 to rotate or in the alternative to rotate throughout only desired sections of the conveyor system 102. In the preferred embodiment, the engaging means includes a plurality of tension rollers or drive rollers 82. The tension rollers 82 are positioned generally underneath the carrying rollers 83, and they are spaced apart from one another a predetermined distance in a parallel relationship. There are fewer tension rollers 82 than carrying rollers 83. In the preferred embodiment, there is one tension roller 82 for every two carrying rollers 83. When the tension rollers 82 are raised, the drive belt 84 is brought into contact with the carrying rollers 83, causing the articles to be transported upon the carrying rollers 83. This is illustrated in FIG. 12 in which the articles 106 are being transported.

Each end of the tension rollers 82 is mounted to a tension block 99. In the preferred embodiment, the shaft 100 of the tension roller 82 passes through the tension block 99 to couple the roller 82 and block 99. The blocks 99 pass through corresponding slots in the frame 91, the slots having a greater height than the height of the blocks 99.

Beneath the blocks 99 on each end of the conveyor system 102 is a "high-low" chain or accumulating chain 92. Because the accumulating chains 92 on each end of the conveyor system are identical and symmetrical, only one will be described. The accumulating chain 92 is an endless chain which is supported by and rides upon suitable brackets 107. The high-low chain 92 has a primary, upper conveying surface and a return path 95.

The accumulating or high-low chain 92 preferably is in the form of an independently controlled, separately driven conveyor belt. In the normal, non-accumulating mode, the accumulating chain 92 is stationary, and the rotation of the drive belt 84 causes the carrying rollers 83 to rotate. The drive belt 84 moves in a clockwise direction (as viewed in FIG. 12). In the preferred embodiment, the high-low chain 92 and the tension blocks 99 are made of a sturdy plastic material.

The accumulating chain 92 preferably includes a plurality of plates which are interconnected to the outer surface of the accumulating chain 92 around its entire circumference. The plates are of two types, high plates 93 and low plates 94. The accumulating chain 92 of the second embodiment 102 is similar to the accumulating conveyor chain 23 of the first embodiment 10, although the accumulating chain 92 is preferably more narrow than plates 93, 94 are grouped together respectively and each group occupies approximately one-half of the circumference of the accumulating conveyor chain 92. The two "high-low" points between the high plates 93 and the low plates 94 are designated 51. In normal operation, when no accumulation of the articles 22 is desired, the high plates 93 underlie the blocks 99 on each end of the tension rollers 82 and the low plates 94 are positioned toward the downstream end of the conveyor system 102.

The height of the plates 93, 94 is such that when the blocks 99 are positioned upon the high plates 93, the blocks 99 and drive rollers 82 are raised to cause the drive belt 84 to come into contact with the carrying rollers 83, and such that when the blocks 99 are positioned upon th low plates 94, the blocks 99 and tension rollers 82 are lowered, causing the carrying rollers 83 to be stationary. In this manner, when the blocks 99 and tension rollers 82 are riding upon the high plates 93, the carrying rollers 83 transport the articles 22. However, when the blocks 99 and tension rollers 82 are positioned against the low plates 94, the drive belt 84 is not in contact with the carrying rollers 83 and the articles 22 rest against the stationary rollers 83 and accumulate.

In normal operation, the articles 22 move along the carrying rollers 83. When no accumulation of the articles 22 is desired, the high-low point 51 is located proximate the downstream end 104 of the system, and the accumulating chain 92 is stationary, with the high plates 93 underlying all of the blocks 99 throughout the length of the conveyor system 102.

However, as with the first embodiment, it is sometimes desirable to allow for accumulation of the articles 22 at the downstream end 104 of the conveyor system 102. As with the first embodiment, travelling sensing means detects the presence or absence of build up of the articles 22. As shown in FIG. 11, the sensing means 108 preferably comprises a reflector 88 and a photoelectric cell 89. The sensing means 108 actuates movement of the high-low point 51 farther back from the downstream end 104 of the conveyor system (toward the left as viewed in FIG. 12). The distance which the accumulating belt 92 and the high-low point 51 moves corresponds to the size of the articles 22. The accumulating or high-low belt 92 is moved by conventional driving means such as a motor (not shown).

The travelling sensor means 108 is operatively connected to the accumulating chain 92 so as to move therewith, as in the first embodiment 10. In this manner, the sensor means 108 moves along the conveyor system 10 in an indexed fashion to detect the extent of the build up of the accumulated articles 22. The sensor means 108 is preferably positioned behind the high-low point 51, i.e., to the right of the high-low point 51 as viewed in FIG. 12.

A call sensor (not shown) used in conjunction with the second embodiment of the present invention can be used as described above in conjunction with the first embodiment. The call sensor actuates a lift system or transporting means having a plurality of lift pistons 90. A horizontal lift plate 98 is positioned upon each lift piston 90. With the second embodiment, the lift piston 90 is preferably located between two adjacent tension rollers 82. When the lift pistons 90 are actuated so as to raise the piston's cylinders, the lift plates 98 come into contact with the bottom of the drive belt 84, causing enough tension in the drive belt 84 so that the drive belt 84 moves the carrying rollers 83 and the articles 22 upon them.

The call sensor also acts to cause movement of the high-low chains 92 back to their original position. The lift pistons are operatively connected to the blocks 99 by frame means 101 so that raising the cylinder in the lift piston 90 causes the blocks 99 to raise within their slot and allows the high-low chains 92 to move freely back to its original position. This process moves the articles 22 downstream, and also returns the high-low point 51 to its original downstream position. When the high-low point 51 is returned to its original position, the call sensor 68 deactuates and lowers the pistons 90 to allow the conveyor system 102 to continue its normal operation. As described above, either a manual or automatic actuating means can be utilized with the piston system 90.

In the operation of the second embodiment of the conveyor system, the articles 22 move along the conveyor system 102 by riding upon the carrying rollers 83, which are rotated and driven by a rotating drive belt 84. At the downstream end 104 of the conveyor system 102, the article 22 passes the high-low point 51, where the article comes to a stop upon stationary rollers 83 at the downstream end 104. When one of the articles 22 stops at the end of the conveyor system 102 without being removed therefrom for transport to the next station, travelling sensor means 108 detects the presence of the article 22. After a certain predetermined amount of time, the accumulating chain 92 and travelling sensor means 108 move back from the downstream end 104 an indexed, predetermined distance. When it is desired to move all or a certain group of accumulated articles 22 off the conveyor system 102, the call sensor actuates the piston system 90, which lifts the drive belt 84 to be in contact with the carrying rollers 83, and also lifts the blocks 99. The articles 22 and accumulating chain 92 are then moved toward the downstream end 104 of the conveyor system 102. The accumulating chain 92 and high-low point 51 are returned to their original positions, at which time the call sensor 68 lowers the pistons 90. The accumulating process then continues.

It is to be understood that numerous and various modifications can be readily devised in accordance with the principles of the present invention by those skilled in the art without departing from the spirit and scope of the invention. Therefore, it is not desired to restrict the invention to the particular constructions illustrated and described but to cover all modifications that may fall within the scope of the appended claims.

What is claimed is:

1. An accumulating conveyor system for conveying articles, comprising:
    (a) a plurality of parallel, rotatable carrying roller upon which the articles are transported from an upstream end to a downstream end of said conveyor system when said rollers rotate;
    (b) a drive belt which is movable between an upper engaged position which causes said carrying rollers to rotate and a lower disengaged position in which said drive belt and carrying rollers do not touch; and
    (c) means for vertically displacing said drive belt, wherein articles are transported through said conveyor system when a corresponding portion of said drive belt is in said upper engaged position, and articles are accumulated when a corresponding portion of said drive belt is in said lower, disengaged position, wherein said vertical displacement means comprises an accumulating belt having a high portion, and a low portion, said accumulating belt supporting said drive belt and being movable with respect to said drive belt.

2. The accumulating conveyor system according to claim 1, wherein said drive belt comprises an endless belt supported upon a plurality of transverse tension rollers, wherein vertical displacement of said tension rollers causes vertical displacement of said drive belt.

3. The accumulating conveyor system according to claim 2, wherein said accumulating belt of said vertical displacement means includes on each end of said tension rollers a plurality of high plates and low plates positioned beneath said ends of said tension rollers, said plates causing said tension rollers to be in said upper and lower positions respectively, wherein said drive belt engages with and drives said carrying rollers when in said upper position, and disengages from said carrying rollers when in said lower position so that the articles come to a rest upon said carrying rollers.

4. The accumulating conveyor system according to Claim 3, further comprising sensor means which causes movement of said accumulating belt and movement of the position of said high and low plates so that articles above said low plates are accumulated.

5. The accumulating conveyor system according to claim 4, wherein said sensor means is operatively interconnected to said accumulating conveyor belt so as to move therewith.

6. The accumulating conveyor system according to claim 3, further comprising expansible lift means to lift all of said tension rollers simultaneously so as to allow said drive belt to drive said carrying rollers and transport accumulated articles toward said downstream end of said conveyor system.

7. An accumulating conveyor system for conveying articles, comprising:
    (a) a plurality of parallel, rotatable carrying rollers upon which the articles are transported from an upstream end to a downstream end of said conveyor system when said rollers rotate;
    (b) a drive belt which is movable between an upper engaged position which causes said carrying rollers to rotate and a lower disengaged position in which said drive belt and carrying rollers do not touch; and
    (c) a means for vertically displacing said drive belt, wherein articles are transported through said conveyor system when a corresponding portion of said drive belt is in said upper engaged position, and articles are accumulated when a corresponding portion of said drive belt is in said lower, disengaged position, wherein said vertical displacement means comprises an accumulating belt having a high portion and a low portion, said accumulating belt supporting said drive belt and being movable with respect to said drive belt; and
    (d) sensor means operatively interconnected to said accumulating belt so as to move therewith, wherein activation of said sensor means causes movement of said accumulating belt so that articles above said low portion are accumulated.

8. The accumulating conveyor system according to claim 7, wherein said drive belt comprises an endless belt supported upon a plurality of transverse tension rollers, wherein vertical displacement of said tension rollers causes vertical displacement of said drive belt.

9. The accumulating conveyor system according to claim 8, wherein said accumulating belt of said vertical displacement means includes on each end of said tension rollers a plurality of high plates and low plates positioned beneath said ends of said tension rollers, said plates causing said tension rollers to be in said upper and lower positions respectively, wherein said drive belt engages with and drives said carrying rollers when in said upper position, and disengages from said carrying rollers when in said lower position so that the articles come to a rest upon said carrying rollers.

10. The accumulating conveyor system according to claim 7, further comprising expansible lift means to lift all of said tension rollers simultaneously so as to allow said drive belt to drive said carrying rollers and transport accumulated articles toward said downstream and of said conveyor system.

UNITED STATES PATENT AND TRADEMARK OFFICE
CERTIFICATE OF CORRECTION

PATENT NO. : 4,863,012
DATED : Sep. 5, 1989
INVENTOR(S) : Keith W. Nord; Mark S. Nord It is certified that error appears in the above-identified patent and that said Letters Patent is hereby corrected as shown below:

In column 10, line 2, for "than plates" read -- than the accumulating conveyor chain 23. The high and low plates--

Signed and Sealed this

Twenty-fifth Day of September, 1990

Attest:

HARRY F. MANBECK, JR.

*Attesting Officer*  *Commissioner of Patents and Trademarks*